(12) United States Patent
Cheng et al.

(10) Patent No.: US 8,081,160 B2
(45) Date of Patent: Dec. 20, 2011

(54) SEPARABLE AND SHAPE-CHANGEABLE MOUSE

(75) Inventors: Yu-Chih Cheng, Taipei (TW); Chin-Kuan Lou, Taipei (TW); Hsiao-Lung Chiang, Taipei (TW)

(73) Assignee: Primax Electronics Ltd., Taipei (TW)

( * ) Notice: Subject to any disclaimer, the term of this patent is extended or adjusted under 35 U.S.C. 154(b) by 1076 days.

(21) Appl. No.: 11/937,339

(22) Filed: Nov. 8, 2007

(65) Prior Publication Data

US 2008/0218478 A1 Sep. 11, 2008

(30) Foreign Application Priority Data

Mar. 9, 2007 (TW) ............................ 96108120 A

(51) Int. Cl.
*G06F 3/033* (2006.01)

(52) U.S. Cl. .................. 345/163; 345/169; 361/679.01

(58) Field of Classification Search .......... 345/156–158, 345/163, 169; 361/679.01, 679.02, 679.57
See application file for complete search history.

(56) References Cited

U.S. PATENT DOCUMENTS

| 5,943,625 | A | * | 8/1999 | Yeom et al. | 455/557 |
| 7,379,051 | B2 | * | 5/2008 | Yin et al. | 345/163 |
| 2004/0179330 | A1 | * | 9/2004 | Lee et al. | 361/679 |

* cited by examiner

*Primary Examiner* — Kimnhung Nguyen

(74) *Attorney, Agent, or Firm* — Kirton & McConkie; Evan R. Witt

(57) ABSTRACT

A separable and shape-changeable mouse includes a first housing, a second housing, a first connecting member and a second connecting member. The first housing includes a cursor signal generation unit, a first slant and a first connecting member. The second housing includes a receptacle for accommodating a battery therein, a second slant and a second connecting member. The first housing is combined with the second housing when the first connecting member is coupled with the second connecting member. By rotating the second housing with respect to the first housing, the shape of the mouse is changeable.

4 Claims, 4 Drawing Sheets

SEPARABLE AND SHAPE-CHANGEABLE MOUSE

FIELD OF THE INVENTION

The present invention relates to a shape-changeable mouse, and more particularly to a separable and shape-changeable mouse.

BACKGROUND OF THE INVENTION

Due to the amazing power of personal computers, personal computers are developed to have various functions. For example, the person computers have word processing functions in the earlier stage and are nowadays used for presentation or used as amusement video tools.

For complying with these various functions of the personal computer, in addition to the conventional cursor control function, the mouse usually has additional function keys used as the controller for presentation control and/or video control.

In a case that the mouse is used as a cursor control device, by moving the mouse on a desk plane, the cursor shown on the display screen of the personal computer is moved in the corresponding movement direction of the mouse. In another case that the mouse is used as a remote controller for presentation control and/or video control, the mouse is held on the palm of the user's hand and the function keys are pressed down to input the operating instructions.

Generally, the shape of the mouse used as the cursor control device and the shape of the mouse used as the remote controller are different. In a case that the mouse is used as a cursor control device to be moved on the desk plane, the surface of the mouse contacting with the palm of the user's hand should be cambered rather than flat. The cambered surface of the mouse may facilitate supporting the palm of the user's hand. Whereas, in another case that the mouse is used as the remote controller, the user favors the mouse having a flat shape as the conventional remote controller.

In other words, it is difficult to design a slim mouse having both functions of using as the cursor control device and the remote controller due to the above reasons. If the housing of the mouse is too thin, the mouse fails to meet the ergonomic demand when the mouse is moved on the desk plane. In contrast, for meeting the requirement of ergonomics, the height and thickness of the mouse should be increased. Under this circumstance, the touch feel of the mouse is impaired when the mouse is used as the remote controller.

In views of the above-described disadvantages resulted from the prior art, the applicant keeps on carving unflaggingly to develop a separable and shape-changeable mouse according to the present invention through wholehearted experience and research.

SUMMARY OF THE INVENTION

It is an object of the present invention to provide a separable and shape-changeable mouse selectively operated in two different use modes by rotating a second housing with respect to a first housing.

In accordance with an aspect of the present invention, there is provided a separable and shape-changeable mouse. The separable and shape-changeable mouse includes a first housing, a second housing, a first connecting member and a second connecting member. The first housing includes a cursor signal generation unit and a first electrical contact, wherein the first housing has a first front part and a first rear part, and the first rear part includes a first slant. The second housing has a receptacle for accommodating a battery therein and includes a second electrical contact, wherein the second housing is separable from the first housing and has a second front part and a second rear part, and the second rear part includes a second slant. The first connecting member and the second connecting member arranged on the first slant and the second slant, respectively. The first housing is combined with the second housing when the first connecting member is coupled with the second connecting member.

In an embodiment, the first connecting member includes two metallic portions on bilateral edges of the first slant and an indentation between the two metallic portions. The second connecting member includes two magnets on bilateral edges of the second slant and a retaining post corresponding to the indentation.

In an embodiment, the first connecting member includes two metallic portions on bilateral edges of the first slant and an elongated indentation between the two metallic portions. The second connecting member includes two magnets on bilateral edges of the second slant and an elongated retaining post corresponding to the indentation.

In an embodiment, the first connecting member includes an elongated recess structure, the second connecting member includes an elongated fastening plate, and the second electrical contact is arranged on the elongated fastening plate, wherein the length of the elongated recess structure is greater than the elongated fastening plate.

In an embodiment, the elongated fastening plate includes two wide plate portions and a narrow plate portion between the two wide plate portions, and the elongated recess structure includes two wide recess portions and two narrow recess portions.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
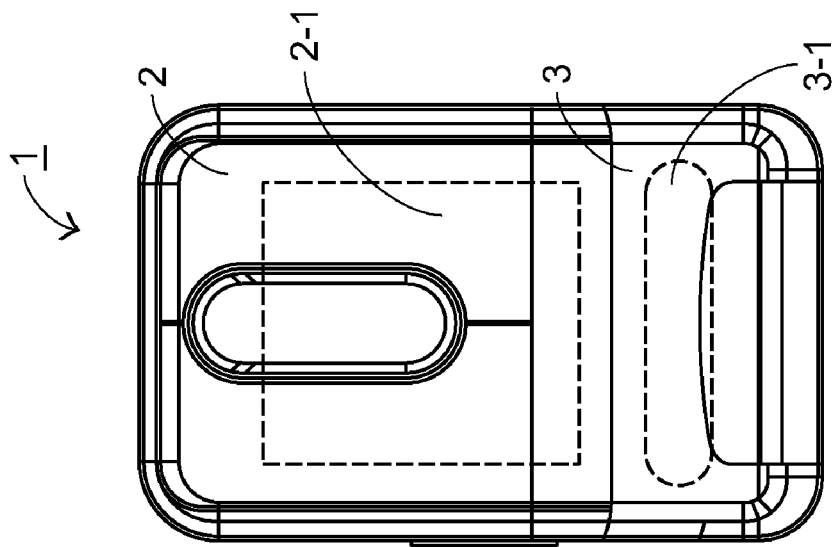
FIG. 1 is a schematic outward view of a separable and shape-changeable mouse according to a broad concept of the present invention.

Referring to FIG. 1, a schematic outward view of a separable and shape-changeable mouse according to a broad concept of the present invention is illustrated. The separable and shape-changeable mouse 1 includes a first housing 2 and a second housing 3. A cursor signal generation unit 2-1 is included in the first housing 2. A battery 3-1 is accommodating within the second housing 3. The first housing 2 and the second housing 3 are detachable from each other. The cursor signal generation unit 2-1 is used for generating a control signal for controlling the cursor shown on the computer screen. The cursor signal generation unit 2-1 includes for example an optical sensor and related circuitry. The operation principles of the cursor signal generation unit 2-1 are known in the art, and are not redundantly described herein.

Figure 2B:
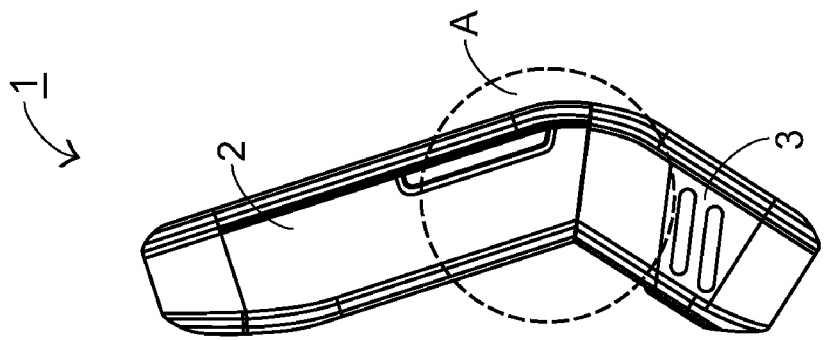
FIGS. 2A and 2B are respectively schematic outward views illustrating the separable and shape-changeable mouse operated in two different use modes.
Figure 2A:
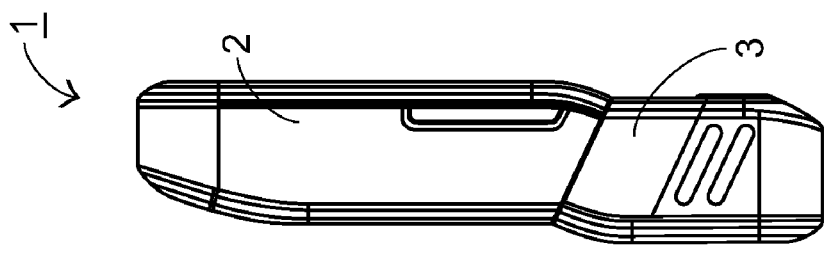

FIGS. 2A and 2B are respectively schematic outward views illustrating the separable and shape-changeable mouse operated in two different use modes. In the first use mode as shown in FIG. 2A, the separable and shape-changeable mouse 1 has a flat surface when the first housing 2 and the second housing 3 are combined together. Due to the flat surface, the separable and shape-changeable mouse has advantage of easy storage. In the second use mode as shown in FIG. 2B, the separable and shape-changeable mouse 1 has a cambered surface A at the boundary between the first housing 2 and the second housing 3 when the first housing 2 and the second housing 3 are combined together. Under this circumstance, the separable and shape-changeable mouse 1 can be used as a cursor control device meeting the ergonomic demand when the user's palm is rested on the cambered surface A.

Figure 3B:
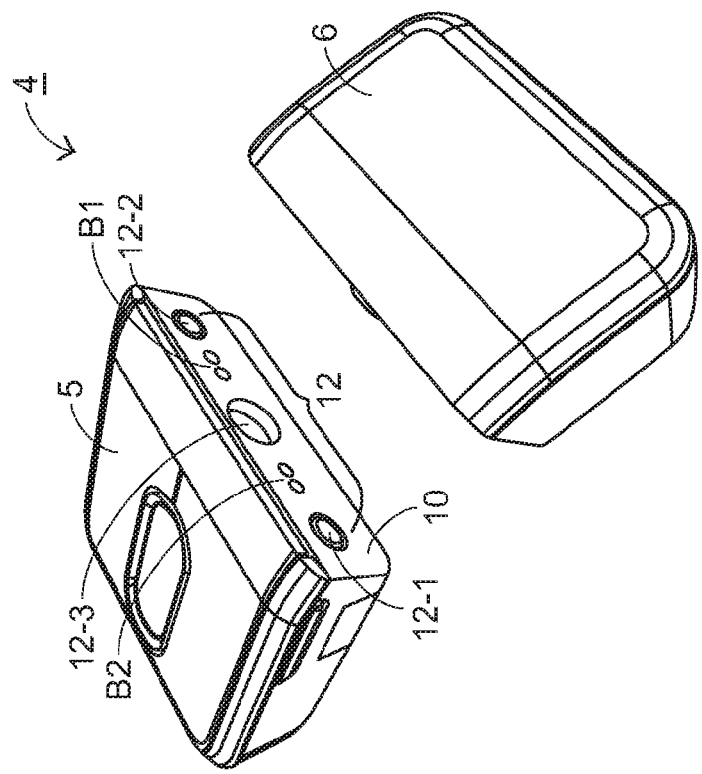
FIGS. 3A and 3B are respectively schematic exploded views of a separable and shape-changeable mouse taken from different viewpoints according to a first preferred embodiment of the present invention.
Figure 3A:
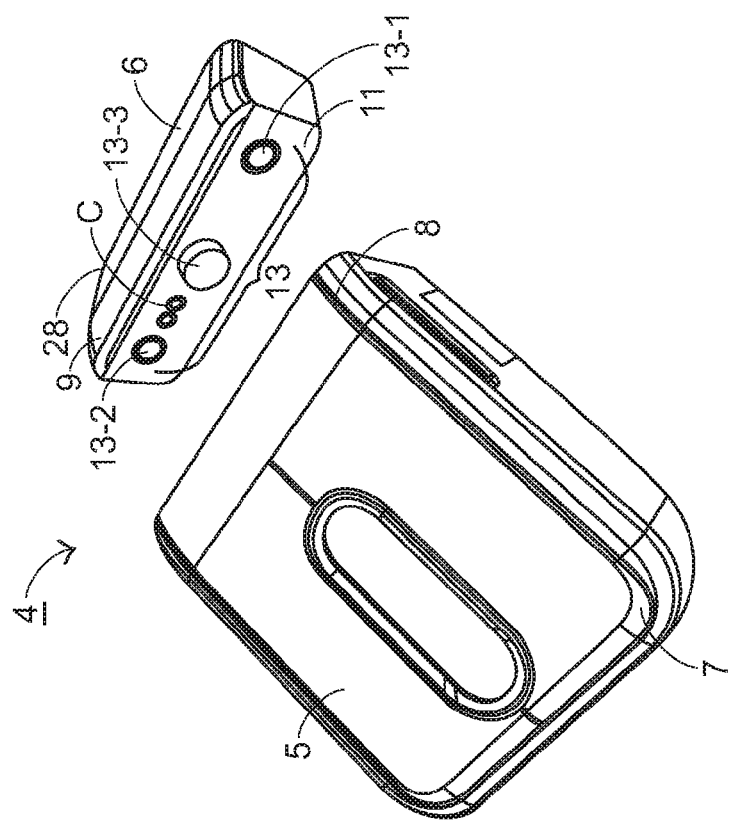

FIGS. 3A and 3B are schematic exploded views of a separable and shape-changeable mouse taken from different viewpoints according to a first preferred embodiment of the present invention. The separable and shape-changeable mouse 4 of FIGS. 3A and 3B includes a first housing 5 and a second housing 6. The first housing 5 includes a first front part 7 and a first rear part 8. The first rear part 8 includes a first slant 10, two first electrical contacts B1, B2, and a first connecting member 12. The first connecting member 12 is arranged on the first slant 10. The second housing 6 includes a second front part 9 and a second rear part 28. The second rear part 28 includes a second slant 11, a second electrical contact C and a second connecting member 13.

Please refer to FIGS. 3A and 3B again. The first connecting member 12 on the first slant 10 of the first housing 5 includes two metallic portions 12-1 and 12-2 and an indentation 12-3. The metallic portions 12-1 and 12-2 are disposed on bilateral edges of the first slant 10. The indentation 12-3 is arranged between the metallic portions 12-1 and 12-2. The second connecting member 13 on the second slant 11 of the second housing 6 includes two magnets 13-1 and 13-2 and a retaining post 13-3. The magnets 13-1 and 13-2 are disposed on bilateral edges of the second slant 11 and corresponding to the metallic portions 12-1 and 12-2, respectively. The retaining post 13-3 is protruded from the second slant 11 and located at the position corresponding to the indentation 12-3 in the first slant 10.

Please refer to FIGS. 3A and 3B again. When the magnets 13-1 and 13-2 of the second housing 6 are respectively magnetically coupled to the metallic portions 12-1 and 12-2 of the first housing 5 and the retaining post 13-3 of the second housing 6 is inserted into the indentation 12-3 of the first housing 5, the first housing 5 and the second housing 6 are combined together. Meanwhile, the first electrical contact B1 of the first housing 5 is contact with the second electrical contact C of the second housing 6 such that the battery (not shown) within the second housing 6 may offer electricity to the circuitry within the first housing 5. Due to the contact between the first slant 10 of the first housing 5 and the second slant 11 of the second housing 6, the separable and shape-changeable mouse 4 has a cambered shape A as shown in FIG. 2B. Under this circumstance, the separable and shape-changeable mouse 4 can be used as a cursor control device to be moved on the desk plane when the user's palm is rested on the cambered surface A. For a purpose of adjusting the mouse 4 to have a flat shape, the second housing 6 should be rotated by 180 degrees. After the magnet 13-1 of the second housing 6 is magnetically coupled to the metallic portion 12-2 of the first housing 5, the magnet 13-2 of the second housing 6 is magnetically coupled to the metallic portion 12-1 of the first housing 5 and the retaining post 13-3 of the second housing 6 is inserted into the indentation 12-3 of the first housing 5, the first housing 5 and the second housing 6 are combined together. Meanwhile, the first electrical contact B2 of the first housing 5 is contact with the second electrical contact C of the second housing 6 and thus the separable and shape-changeable mouse 4 has a flat shape as shown in FIG. 2A. Under this circumstance, the separable and shape-changeable mouse 4 can be used as a remote controller.

It is noted that, however, those skilled in the art will readily observe that numerous modifications and alterations may be made while retaining the teachings of the invention. For example, if there is no remote control function when the mouse 4 has the flat shape, the first electrical contact B2 of the first housing 5 may be optionally exempted because it is not necessary to transmit electricity to the circuitry within the first housing 5.

Figure 4B:
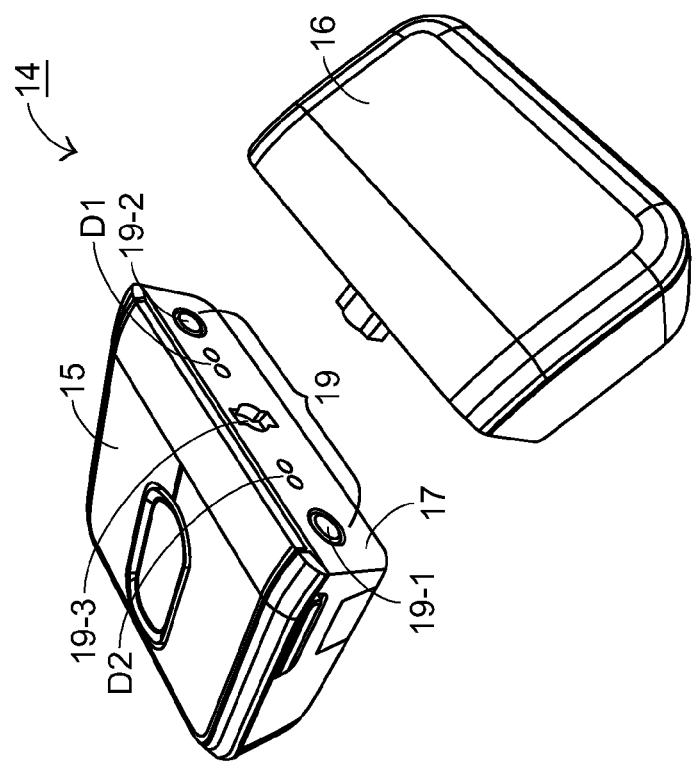
FIGS. 4A and 4B are respectively schematic exploded views of a separable and shape-changeable mouse taken from different viewpoints according to a second preferred embodiment of the present invention.
Figure 4A:
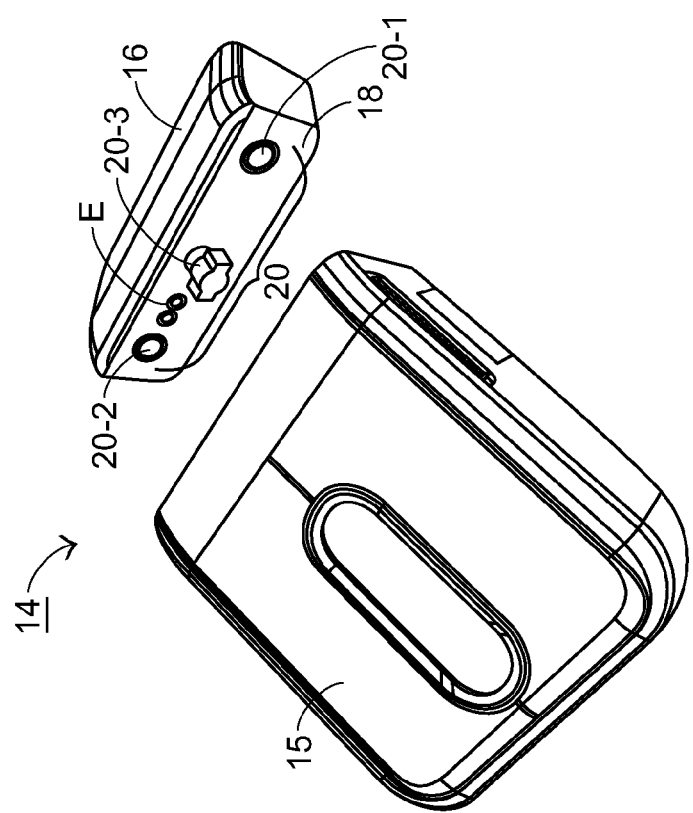

FIGS. 4A and 4B are respectively schematic exploded views of a separable and shape-changeable mouse taken from different viewpoints according to a second preferred embodiment of the present invention. The separable and shape-changeable mouse of FIG. 4 is distinguished from that of FIG. 3 by the connecting members. The separable and shape-changeable mouse 14 of FIGS. 4A and 4B includes a first housing 15 and a second housing 16. The first housing 15 includes a first slant 17. The second housing 16 includes a second slant 18. Two first electrical contacts D1, D2 and a first connecting member 19 are arranged on the first slant 17. A second electrical contact E and a second connecting member 20 are arranged on the second slant 18. The first connecting member 19 of the first housing 15 includes two metallic portions 19-1 and 19-2 and an elongated indentation 19-3. The metallic portions 19-1 and 19-2 are disposed on bilateral edges of the first slant 17. The second connecting member 20 of the second housing 16 includes two magnets 20-1 and 20-2 and an elongated retaining post 20-3.

Hereinafter, the operations of the separable and shape-changeable mouse 14 will be illustrated in more details as follows with reference to FIGS. 4A and 4B.

First of all, the second housing 16 is rotated by 90 degrees with respect to the first housing 15 such that the long edges of the elongated retaining post 20-3 are substantially aligned with the long edges of the elongated indentation 19-3. Then, the elongated retaining post 20-3 of the second housing 16 is inserted into the elongated indentation 19-3 of the first housing 15. Then, the second housing 16 is reversely rotated by 90 degrees to the original position such that the long edges of the elongated retaining post 20-3 are perpendicular to the long edges of the elongated indentation 19-3. As a consequence, the second housing 16 fails to be detached from the first housing 15. Moreover, since the magnets 20-1 and 20-2 of the second housing 16 are respectively magnetically coupled to the metallic portions 19-1 and 19-2 of the first housing 15, the first housing 15 and the second housing 16 are combined together. Meanwhile, the first electrical contact D1 of the first housing 15 is contact with the second electrical contact E of the second housing 16. Due to the contact between the first slant 17 of the first housing 15 and the second slant 18 of the second housing 16, the separable and shape-changeable mouse 14 has a cambered shape A as shown in FIG. 2B. For a purpose of adjusting the mouse 14 to have a flat shape, the second housing 16 should be rotated by 180 degrees. Meanwhile, the magnet 20-2 of the second housing 16 is magnetically coupled to the metallic portion 19-1 of the first housing 15 and the magnet 20-1 of the second housing 16 is magnetically coupled to the metallic portion 19-2 of the first housing 15, and the first electrical contact D2 of the first housing 15 is contact with the second electrical contact E of the second housing 16. As a consequence, the separable and shape-changeable mouse 14 has a flat shape as shown in FIG. 2A. Likewise, if there is no remote control function when the mouse 14 has the flat shape, the first electrical contact D2 of the first housing 15 may be optionally exempted because it is not necessary to transmit electricity to the circuitry within the first housing 5.

Figure 5B:
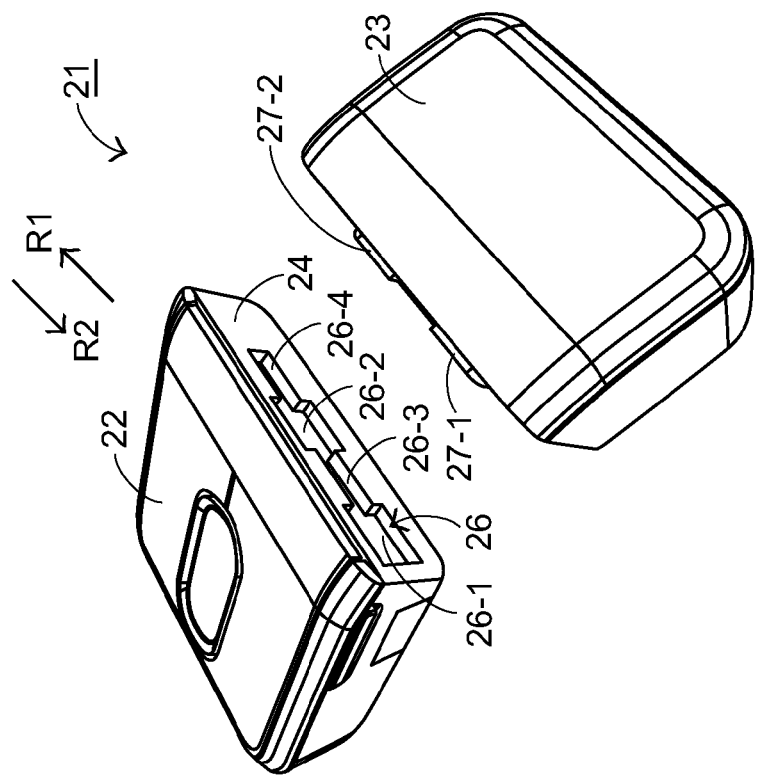
FIGS. 5A and 5B are respectively schematic exploded views of a separable and shape-changeable mouse taken from different viewpoints according to a third preferred embodiment of the present invention.
Figure 5A:
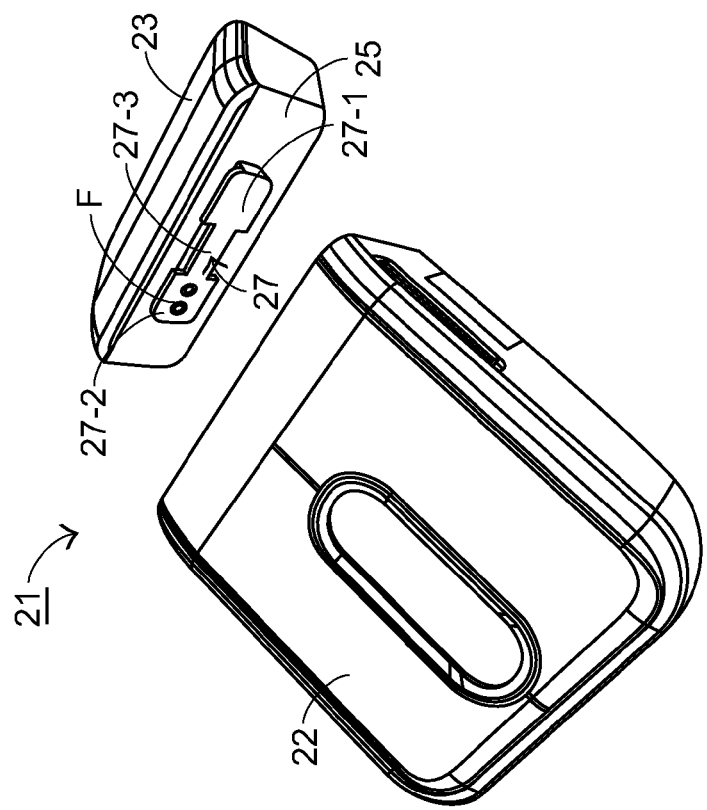

FIGS. 5A and 5B are respectively schematic exploded views of a separable and shape-changeable mouse taken from different viewpoints according to a third preferred embodiment of the present invention. The separable and shape-changeable mouse of FIG. 5 is distinguished from those of FIGS. 2 and 3 by the connecting members. The separable and shape-changeable mouse 21 of FIGS. 5A and 5B includes a first housing 22 and a second housing 23. The first housing 22 includes a first slant 24. The second housing 23 includes a second slant 25. A first connecting member 26 and a second connecting member 27 are disposed on the first slant 24 and the second slant 25, respectively. The first connecting member 26 is an elongated recess structure including a first wide recess portion 26-1, a second wide recess portion 26-2, a first narrow recess portion 26-3 and a second narrow recess portion 26-4. The second connecting member 27 is an elongated fastening plate including a first wide plate portion 27-1, a second wide plate portion 27-2 and a narrow plate portion 27-3. An electrical contact F is arranged on the second wide plate portion 27-2. A corresponding electrical contact (not shown) is arranged inside the first housing 22.

Hereinafter, the operations of the separable and shape-changeable mouse 21 will be illustrated in more details as follows with reference to FIGS. 5A and 5B.

First of all, the first wide plate portion 27-1, the second wide plate portion 27-2 and the narrow plate portion 27-3 of the elongated fastening plate 27 are respectively aligned with the first wide recess portion 26-1, the second wide recess portion 26-2 and the first narrow recess portion 26-3 of the elongated recess structure 26 to insert the elongated fastening plate 27 into the elongated recess structure 26. Then, the second housing 23 is moved in the direction R1 such that the first wide plate portion 27-1 and the second wide plate portion 27-2 of the elongated fastening plate 27 are aligned with the first narrow recess portion 26-3 and the second narrow recess portion 26-4 of the elongated recess structure 2, respectively. Since the width of each of the first wide plate portion 27-1 and the second wide plate portion 27-2 is greater than that of each of the first narrow recess portion 26-3 and the second narrow recess portion 26-4, the plate portions 27-1 and 27-2 are stopped by the recess portions 26-3 and 26-4. Meanwhile, the second housing 23 and the first housing 22 are combined together and thus the separable and shape-changeable mouse 21 has a cambered shape A as shown in FIG. 2B. For a purpose of adjusting the mouse 21 to have a flat shape, the second housing 23 is moved in the direction R2 such that the first wide plate portion 27-1 and the second wide plate portion 27-2 of the elongated fastening plate 27 are respectively aligned with the first wide recess portion 26-1 and the second wide recess portion 26-2 to detach the elongated fastening plate 27 from the elongated recess structure 26. After the second housing 23 is separated from the first housing 22, the second housing 23 needs to be rotated by 180 degrees. Next, the first wide plate portion 27-1, the second wide plate portion 27-2 and the narrow plate portion 27-3 of the elongated fastening plate 27 are respectively aligned with the first wide recess portion 26-1, the second wide recess portion 26-2 and the first narrow recess portion 26-3 of the elongated recess structure 26 to insert the elongated fastening plate 27 into the elongated recess structure 26. Next, the second housing 23 is moved in the direction R1 such that the first wide plate portion 27-1 and the second wide plate portion 27-2 of the elongated fastening plate 27 are aligned with the first narrow recess portion 26-3 and the second narrow recess portion 26-4 of the elongated recess structure 2, respectively. Meanwhile, the separable and shape-changeable mouse 21 has a flat shape as shown in FIG. 2A and thus can be used as a remote controller.

From the above description, the second housing is combined with the first housing when the first slant is in contact with the second slant. Since the second housing is rotatable relative to the first housing, the separable and shape-changeable mouse has both functions of using as either a cursor control device or a remote controller according to the user's requirement. In other words, the mouse of the present invention may be adjusted to have a flat shape when acted as a remote controller and meet the ergonomic demand when acted as a cursor control device.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A separable and shape-changeable mouse comprising:
a first housing including a cursor signal generation unit and a first electrical contact, wherein said first housing has a first front part and a first rear part, and said first rear part includes a first slant;
a second housing having a receptacle for accommodating a battery therein and including a second electrical contact, wherein said second housing is separable from said first housing and has a second front part and a second rear part, and said second rear part includes a second slant; and
a first connecting member and a second connecting member arranged on said first slant and said second slant, respectively, wherein said first housing is combined with said second housing when said first connecting member is coupled with said second connecting member, wherein said first connecting member includes two metallic portions on bilateral edges of said first slant and an indentation between said two metallic portions, and said second connecting member includes two magnets on bilateral edges of said second slant and a retaining post corresponding to said indentation.

2. A separable and shape-changeable mouse comprising:
a first housing including a cursor signal generation unit and a first electrical contact, wherein said first housing has a first front part and a first rear part, and said first rear part includes a first slant;
a second housing having a receptacle for accommodating a battery therein and including a second electrical contact, wherein said second housing is separable from said first housing and has a second front part and a second rear part, and said second rear part includes a second slant; and a first connecting member and a second connecting member arranged on said first slant and said second slant, respectively, wherein said first housing is combined with said second housing when said first connecting member is coupled with said second connecting member, wherein said first connecting member includes two metallic portions on bilateral edges of said first slant and an elongated indentation between said two metallic portions, and said second connecting member includes two magnets on bilateral edges of said second slant and an elongated retaining post corresponding to said indentation.

3. A separable and shape-changeable mouse comprising:

a first housing including a cursor signal generation unit and a first electrical contact, wherein said first housing has a first front part and a first rear part, and said first rear part includes a first slant;

a second housing having a receptacle for accommodating a battery therein and including a second electrical contact, wherein said second housing is separable from said first housing and has a second front part and a second rear part, and said second rear part includes a second slant; and a first connecting member and a second connecting member arranged on said first slant and said second slant, respectively, wherein said first housing is combined with said second housing when said first connecting member is coupled with said second connecting member, wherein said first connecting member includes an elongated recess structure, said second connecting member includes an elongated fastening plate, and said second electrical contact is arranged on said elongated fastening plate, wherein the length of said elongated recess structure is greater than said elongated fastening plate.

4. The separable and shape-changeable mouse according to claim 3 wherein said elongated fastening plate includes two wide plate portions and a narrow plate portion between said two wide plate portions, and said elongated recess structure includes two wide recess portions and two narrow recess portions.

* * * * *